United States Patent [19]

Macken et al.

[11] 4,156,124

[45] May 22, 1979

[54] IMAGE TRANSFER LASER ENGRAVING

[75] Inventors: John A. Macken; Paul N. Palanos, both of Santa Rosa, Calif.

[73] Assignee: Optical Engineering, Inc., Santa Rosa, Calif.

[21] Appl. No.: 787,471

[22] Filed: Apr. 14, 1977

[51] Int. Cl.² .............................................. B23K 9/00
[52] U.S. Cl. ......................... 219/121 L; 219/121 LM
[58] Field of Search ............ 219/121 L, 121 LM, 158, 219/159, 121 EB, 121 EM

[56] References Cited

U.S. PATENT DOCUMENTS

| 3,118,050 | 1/1964 | Hetherington | 219/121 EB |
| 3,396,401 | 8/1968 | Nonomura | 219/121 L |
| 3,440,388 | 4/1969 | Otstot et al. | 219/121 LM |
| 3,549,733 | 12/1970 | Caddell | 219/121 LM |
| 3,965,327 | 6/1976 | Ehlscheid et al. | 219/121 LM |

*Primary Examiner*—J. V. Truhe
*Assistant Examiner*—Fred E. Bell
*Attorney, Agent, or Firm*—Edward E. Roberts

[57] ABSTRACT

The invention relates to a non-contact laser engraving apparatus and process. A laser beam is directed onto a work piece by a mask arrangement. The mask can be transparent or reflective. Optical means are used to transfer the laser beam and thus the image produced by the mask onto the work piece. In one embodiment parallel support tables hold the mask and the work piece in fixed, spaced apart, parallel arrangement. The support tables and/or the laser beam source are moved relative to each other such that the beam scans the mask and thus the work piece.

11 Claims, 6 Drawing Figures

IMAGE TRANSFER LASER ENGRAVING

BACKGROUND

1. Field of the Invention

This invention relates to a method of engraving materials using a laser and a mask which is spatially removed from the parts to be engraved.

2. Prior Art

It is well known that lasers can develop sufficient power densities to vaporize certain materials. Lasers such as high-power carbon dioxide lasers can vaporize many materials such as wood, plastic and rubber, relatively efficiently. Once the output from a laser is focused to a power density greater than approximately 10,000 watts per centimeter, it is possible to remove material from the surface of organic solids even when the laser beam is rapidly scanned across the surface. Of course, areas not struck by the laser beam are not vaporized. The use of the laser offers the potential of producing very intricate engravings in the proper material. One method of selectively engraving areas of a material is to manipulate the laser beam along the areas to be removed, using the laser much like a wood carver uses a knife. However, this method does not lend itself to mass production.

Another method of laser engraving uses a thin metal mask which is placed in contact with the part to be engraved. As the laser beam scans back and forth the beam penetrates to and vaporizes the part to be engraved only in the area which is not protected by the metal mask. Inasmuch as metals can withstand high laser power densities without being damaged, metal masks are not affected by the laser. This process, however, cannot produce detailed contours; moreover this process is not well suited for mass production inasmuch as fragile metal masks must be placed on and removed from the materials which are to be engraved.

BRIEF DESCRIPTION OF THE PREFERRED EMBODIMENTS

Figure 1:
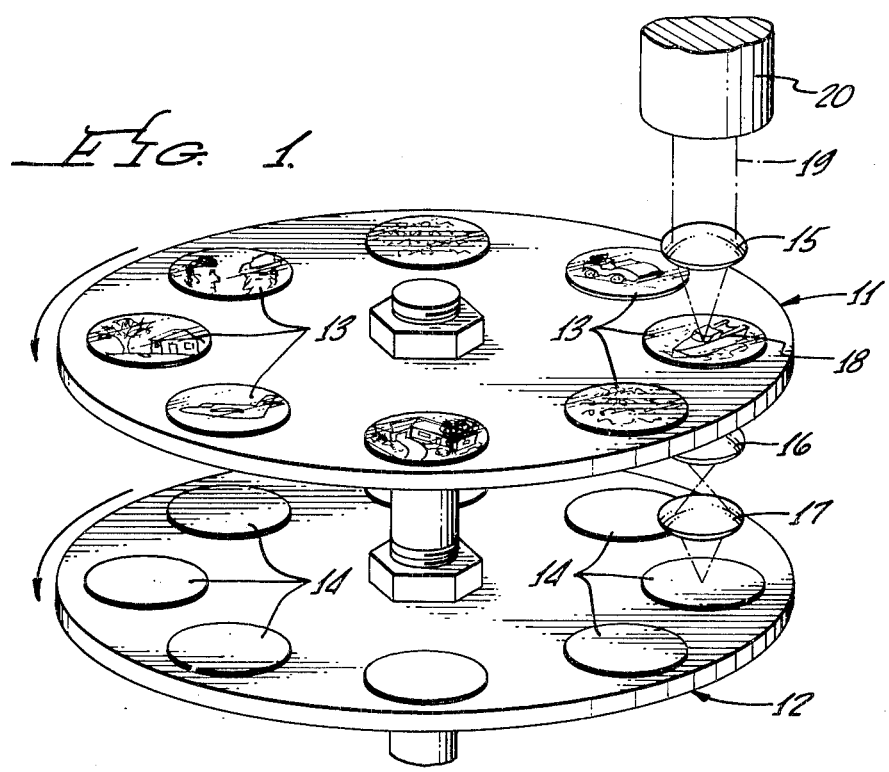
FIG. 1 is a perspective view of an image transfer laser engraving system using transparent masks.
Figure 2:
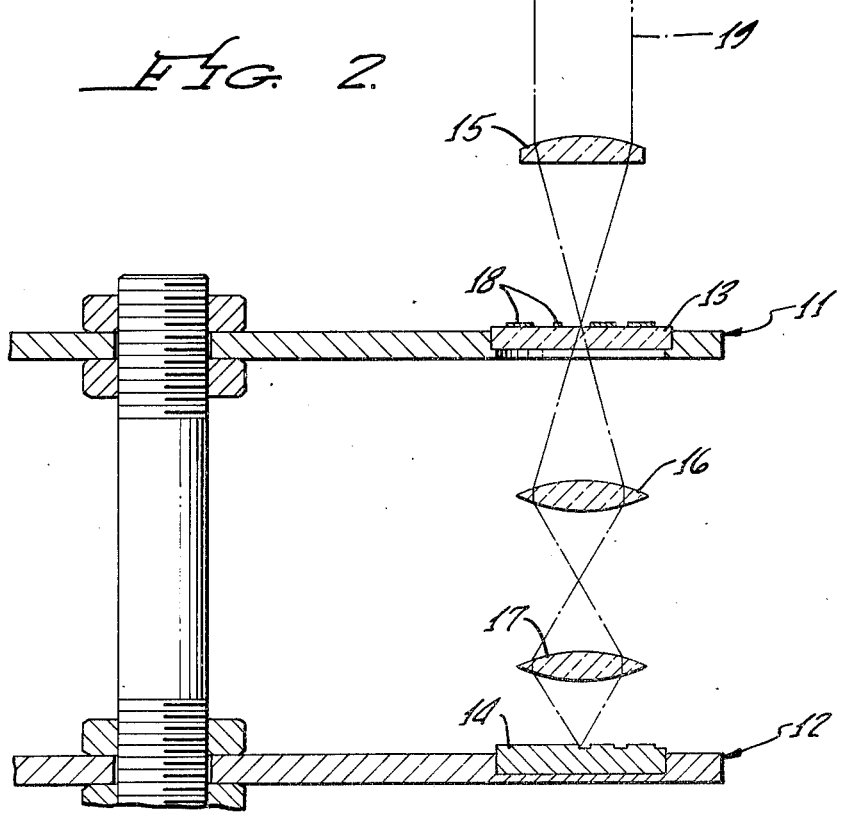
FIG. 2 is a cross-sectional view of a portion of the system shown in FIG. 1.

Referring concurrently to FIGS. 1 and 2, a laser 20 is shown in schematic representation. Laser 20 emits beam 19. Beam 19 passes through a suitable optical or focal system represented by lens 15, such that the beam is concentrated as it reaches the position of the transparent mask 13. It is not necessary for beam 19 to be precisely focused on the surface of the mask 13, but merely concentrated to a power density which is suitable for laser engraving the subject material while not damaging the mask material. Transparent mask 13 has reflecting areas 18 which block the beam. When the beam passes through a transparent area in mask 13, it passes through another optical system represented by lenses 16 and 17. These lenses are arranged to transfer an image of transparent mask 13 to the part 14 which is to be engraved. The image is transferred with unity magnification and the same orientation as mask 13.

If only one lens is used for this function, the image transferred to work piece 14 will be reversed from the orientation of the mask. This reverse orientation causes problems which will be explained in greater detail infra. Part 14 which is to be engraved is positioned at the point where the two transfer lenses reimage transparent mask 13. Conversely, of course, the optical system is effective to reimage mask 13 at work piece 14.

In the example shown in FIGS. 1 and 2, tables 11 and 12 supporting transparent masks 13 and work pieces 14 rotate and translate together while laser 20 and lenses 15, 16 and 17 are stationary. The mechanism could be arranged so that the entire area of transparent mask 13 is scanned by laser beam 19 in the spiral scan pattern characteristic of this type of arrangement. The beam which passes through mask 13 in the area not coated with reflecting coating 18 is transferred onto the part to be engraved. The areas in the mask represented by reflecting coating 18 permit no engraving to take place in the areas where the reflecting coating is imaged on the work piece. That is, reflecting coating 18 prevents beam 19 from impinging upon and engraving work piece 14.

By making reflecting coating 18 partially transparent, thereby allowing a reduced intensity of laser beam 19 to strike certain areas on work piece 14, various contours can be produced. That is, the depth of the engraving on the sample is proportional to the intensity of the laser beam on the work piece. The beam intensity is also proportional to the beam transmission or transparency of the corresponding area in mask 13.

Figure 3:
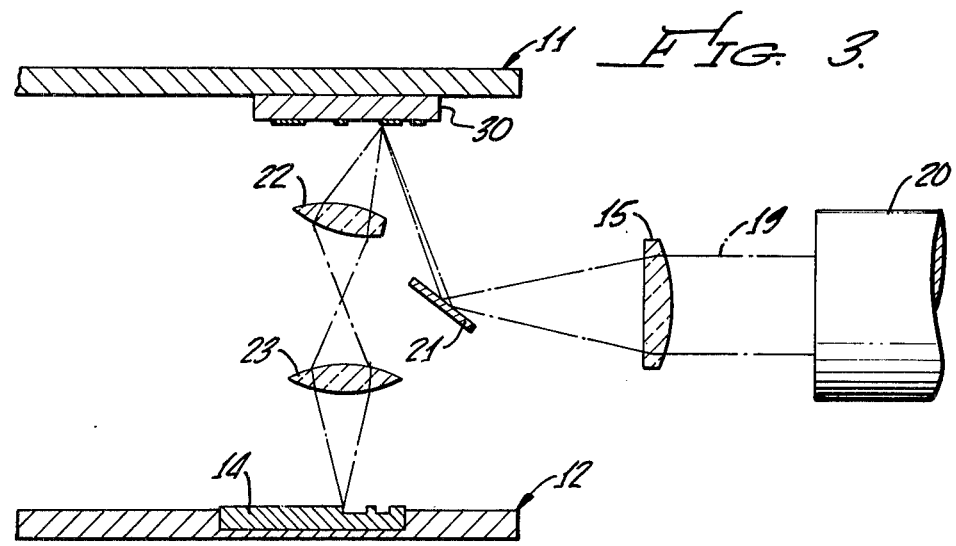
FIG. 3 is a cross-sectional view of an image transfer laser engraving system using a reflecting mask.

Referring now to FIG. 3 there is shown a variation of this technique in which reflection mask 30 is used. This type of mask is more suitable for use with lasers which emit at long wavelengths, such as the carbon dioxide laser. This type of laser emits a beam having a wavelength of 10 microns and suffers from the problem that there are no suitable materials to use as the window material in the transmission mask. Common window materials such as glass and quartz do not transmit at long infrared wavelengths. Only materials such as sodium chloride which is hygroscopic, or germanium which is very expensive and not available in large sizes, can be used for long wavelength infrared windows. Therefore, there are circumstances which would make a transmission mask undesirable. Details of the construction of a reflection mask are given infra. However, in general, mask 30 contains areas 32 which are specularly reflecting, e.g. mirrored. Other areas of reflection mask 30 do not specularly reflect because they either absorb or scatter the incident light. The materials used to make the mask are chosen so that they can withstand the laser power densities required for engraving the sample.

In FIG. 3, laser 20 emits a beam 19 which passes through lens system 15 which concentrates the laser light. The concentrated beam is projected between tables 11 and 12 where it strikes turning mirror 21 which reflects the light onto reflecting mask 30. When the beam strikes mirrored area 32 of mask 30, the light is specularly reflected off the mask through a suitable optical system including, for example, lenses 22 and 23 to reach the work piece 14. Lenses 22 and 23 (FIG. 3) differ from lenses 16 and 17 (FIG. 2) inasmuch as they not only focus the laser light but also introduce a net deflection to the laser light so that they act both as lenses and prisms. While it is not absolutely necessary that the lenses 22 and/or 23 have this "wedge" incorporated into their design, the addition of the "wedge" permits the beam to impinge upon work piece 14 perpendicular to the surface thereof. If the work piece is tilted at the angle in order to be perpendicular to the direction of the laser light as it is reflected from mask 30 to lens 22, the reflecting mask and the sample being engraved are not in the same plane. This condition, i.e. nonparallel, produces a defocusing effect which blurs the image in at least some areas of work piece 14. Like transmitting mask 13 (FIGS. 1 and 2), reflecting mask 30 modulates laser beam 19. Thus, when the beam strikes mask areas which are not highly specularly reflective, the intensity of the reflected component of the light beam is reduced or eliminated. Consequently, the degree of reflectivity of mask 30 determines how deep the laser cuts will occur in work piece 14. This effect permits contoured patterns to be generated.

Referring concurrently to FIGS. 1, 2 and 3, masks 13 and 30 are supported by table 11, while sample or work piece 14 is supported by table 12. To accurately transfer the image contained in or on the mask to the sample, tables 11 and 12 must be held stationary relative to each other while laser beam 19 scans the table surfaces. There are many ways of holding these two surfaces fixed in relation to each other while scanning with the laser beam. For example, as suggested in FIGS. 1 and 2, tables 11 and 12 are rigidly attached to each other by means of a suitable axis arrangement. The axis arrangement also assures that the tables remain separated by a fixed amount. In this embodiment laser 20, and thus laser beam 19, is held stationary while the tables rotate rapidly. In addition, tables 11 and 12 also translate slowly to produce the effect of a spiral scan by laser beam 19. Conversely of course the translating motion can be accomplished by moving laser beam 19 and/or lens systems. Besides a spiral scan, other mechanical apparatus can be utilized to produce a zig-zag type of overlapping scan or a raster scan. These approaches require only mechanical skill to produce the design and do not depart from the spirit of this invention.

It should also be noted that optical systems comprising an even number of lenses e.g. two, are shown. For example, lenses 16 and 17 in FIG. 2, and lenses 22 and 23 in FIG. 3, transfer the image of the respective mask 13 or 30 onto samples 14 to be engraved. These lenses are preferably of equal focal length and are positioned so that the image produced on the sample is the same size (unity magnification) as the mask. If only one lens is used, or if an odd number of lenses is used, the image produced on work piece 14 would be inverted and reversed relative to the mask.

This latter approach is acceptable if the laser beam is focused to an extremely fine point as it passes through or is reflected from the mask so that the resolution obtainable in the engraving is equal to the minimum spot size of the laser beam on the mask. However, if two lenses are, or if an even number of lenses are used, the laser beam can be enlarged from the extremely small size without degrading the resolution of the engraving process. That is, with two lenses the image of the mask remains stationary when it is projected on the sample, even when the mask and the sample move relative to the lenses. However, with a single lens, the projected image "moves" in the opposite direction when the mask and the sample are moved relative to the lens. Consequently, with a single lens there is a smearing effect which limits the resolution to the spot size of the laser beam on the mask.

Figure 4:
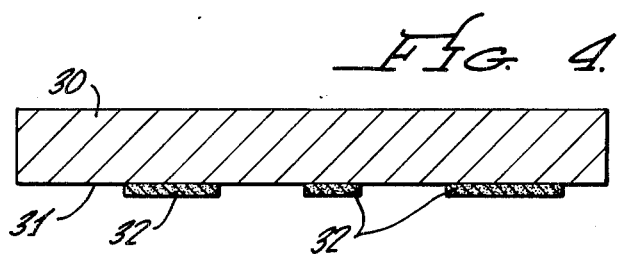
FIG. 4 is a cross-sectional view of a reflecting mask which includes a mirrored substrate and an absorbing coating.
Figure 5:
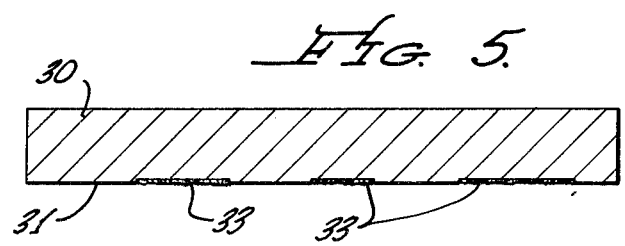
FIG. 5 is a cross-sectional view of a reflecting mask which includes a mirrored substrate and diffusely reflecting areas.
Figure 6:
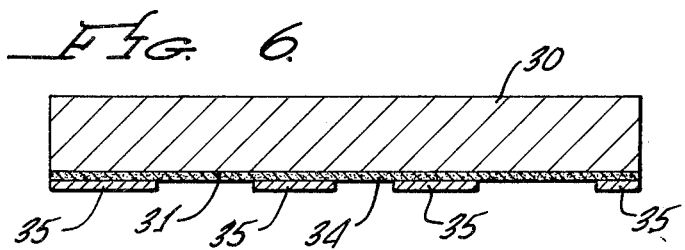
FIG. 6 is a cross-sectional view of a reflecting mask which includes an absorbing coating and a reflecting area on a suitable substrate.

FIGS. 4, 5 and 6 are cross-sectional views of different constructions of reflection masks. Referring to FIG. 4, mask 30 comprises a suitable substrate which includes mirrored surface 31 and absorbing coating 32 arranged to define a selected pattern. Coating 32 typically comprises material such as paint, glass frit silk screened onto a flat polished substrate, anodizing on a mirrored substrate such as aluminum, or the like. Tests indicate that an anodized aluminum substrate makes a very absorbent coating which can withstand high laser power densities.

FIG. 5 shows a somewhat different reflective mask. Substrate material of mask 30 again has a polished, specularly reflecting surface 31. However, instead of an absorbing coating, diffusely reflecting surface 33 is used to diminish the intensity of the laser light which falls within the acceptance angle of lens 22 in FIG. 3. To make diffusely reflecting surface 33, many techniques, such as chemical etching, sandblasting, or flame spraying a metallic powder are known.

FIG. 6 shows another structural configuration for reflecting templates. In this embodiment, the substrate of mask 30 is a material, such as aluminum, which can be anodized. An absorbing coating 34, such as an anodized layer, which withstands the laser power and has a glossy surface covers the entire surface of the substrate. Glossy absorbent coating 34 is overcoated with a pattern comprising reflecting layer 35, such as vapor-deposited copper or chemically deposited silver. This produces a mask which includes a uniformly specularly reflecting pattern formed from a thin metal coating which is backed by a light absorbent layer The reflecting coating is, typically, etched away in selected areas using well known techniques employing photo resist and chemical etching to reveal the absorbing coating beneath.

In FIGS. 4, 5 and 6, the example was given in which the surface of mask 30 was either strongly absorbent or highly reflecting. However, if contours are to be produced, it is necessary to be able to make intermediate levels of reflectivity. This can be accomplished by controlling the thickness of the coating layers such that the absorbing coating is thin enough to allow some reflection from the substrate or conversely such that the reflecting coating is thin enough to allow some absorption by the substrate layer.

Similarly, in the reflecting mask shown in FIG. 5, different amounts of reflection can be accomplished by different degrees of roughness in the diffusing areas. Alternatively, in making a reflecting mask, the absorbent or reflective layer can comprise a dot pattern with varying density to produce the effect of varying degrees of reflectivity. The dot pattern can be established in layers 32, 33, 34 or 35 as desired. To be useful for laser engraving, the dot pattern should be considerably finer than the resolution of the laser engraving system. If this is the case, the individual high and low reflectivity areas in the dot patterns will be too fine to be reproduced in the engraving and only the average reflectivity of this dot pattern will remain. Therefore, by changing the density of the dot patter, it is possible to produce the equivalent of varying reflectivity.

It should be obvious to those skilled in the art that curved mirrors are the optical equivalent to lenses. Therefore, the optical system used with the invention can also be made using curved mirrors if the proper modifications are made. Also it has been implied that the laser beam is approximately circular in shape when it strikes the mask and the sample being engraved. However, for some applications it is more desirable that the laser beam be brought to a line focus. In this case, lens 15 in FIGS. 1, 2 and 3 is a cylindrical lens to produce a line focus on the mask. Conversely, of course, additional optics can be inserted to produce a line focus. These techniques are well known to those skilled in the art, and do not depart from the spirit of this invention. Moreover, this description is intended to be illustrative only and not limitative of the invention. The scope of the invention is defined only by the claims appended hereto.

Having thus described the invention, what is claimed is:

1. Laser engraving apparatus comprising:
   source means for a laser beam;
   first and second support tables having support means for holding said tables fixed in spatial orientation to each other;
   at least one mask having an image thereon supported by said first support table;
   at least one work piece supported by said second support table;
   first optical means for directing and controlling said laser beam such that said laser beam impinges upon said mask;
   second optical means for directing said laser beam from said mask to said work piece to thereby project said image onto said work piece, said second optical means including an even number of focusing elements between said first and second tables whereby said image is projected onto said work piece with the same orientation as it appears on said mask; and
   said support means including means for rotating said first and second support tables in synchronism and means for separating said first and second support tables a preselected distance to cooperate with the positioning and focal lengths of said focusing elements whereby said image is projected onto said work piece with unity magnification.

2. The apparatus recited in claim 1 wherein said mask is at least partially transparent to said laser beam whereby said image of said mask is projected onto said work piece when said laser beam is transmitted through said mask.

3. The apparatus recited in claim 1 wherein said mask is at least partially nonspecularly reflective of said laser beam whereby an image of said mask is projected onto said work piece when reflected portions of said laser beam are reflected from said mask and directed to said work piece.

4. The apparatus recited in claim 3 wherein said nonspecularly reflective mask includes portions thereof which are absorptive of said laser beam.

5. The apparatus recited in claim 3 wherein said nonspecularly reflective mask includes:
   a substrate;
   a layer of absorptive material on a surface of said substrate; and
   a patterned layer of reflective material on said layer of absorptive material.

6. The apparatus recited in claim 1 wherein said mask includes at least one specularly reflecting area and at least one nonspecularly reflecting area.

7. The apparatus recited in claim 2 wherein said mask is selectively partially transparent to thereby produce contours on said work piece when said laser beam is directed to said work piece.

8. The apparatus recited in claim 3 wherein said nonspecularly reflective mask includes portions thereof which scatter said laser beam.

9. The apparatus recited in claim 3 wherein said mask is selectively partially reflective to thereby produce contours on said work piece when said laser beam is directed to said work piece by said optical means.

10. The apparatus recited in claim 1 including means for translating said tables to produce the effect of scanning by said laser beam.

11. The apparatus recited in claim 1 including means for controllably moving said focusing elements to produce the effect of scanning by said laser beam.

* * * * *